(12) United States Patent
Koskinen et al.

(10) Patent No.: US 7,228,124 B2
(45) Date of Patent: Jun. 5, 2007

(54) METHOD AND DEVICE FOR SPEEDING UP AND SIMPLIFYING INFORMATION TRANSFER BETWEEN ELECTRONIC DEVICES

(75) Inventors: Topi Koskinen, Tampere (FI); Juha Kalliokulju, Vesilahti (FI)

(73) Assignee: Nokia Corporation, Espoo (FI)

( * ) Notice: Subject to any disclaimer, the term of this patent is extended or adjusted under 35 U.S.C. 154(b) by 406 days.

(21) Appl. No.: 10/325,193

(22) Filed: Dec. 20, 2002

(65) Prior Publication Data
US 2003/0125064 A1 Jul. 3, 2003

(30) Foreign Application Priority Data
Dec. 31, 2001 (FI) .................................. 20012612

(51) Int. Cl.
*H04Q 7/22* (2006.01)
*H04Q 7/38* (2006.01)
*H04B 7/00* (2006.01)

(52) U.S. Cl. ............................. 455/412.1; 455/414.1; 455/66.1; 348/207.1

(58) Field of Classification Search ................ 455/566, 455/466, 412.1, 418, 414, 414.1, 414.3, 66.1; 348/17, 207.1
See application file for complete search history.

(56) References Cited

U.S. PATENT DOCUMENTS

| | | | |
|---|---|---|---|
| 5,448,285 A | | 9/1995 | Kadowaki |
| 5,608,446 A | | 3/1997 | Carr et al. |
| 5,652,789 A | | 7/1997 | Miner et al. |
| 5,806,005 A | * | 9/1998 | Hull et al. .................. 455/566 |
| 6,373,516 B1 | * | 4/2002 | Kim ........................ 348/14.01 |
| 6,535,243 B1 | * | 3/2003 | Tullis ....................... 348/207.1 |
| 6,564,070 B1 | * | 5/2003 | Nagamine et al. ........ 455/556.1 |
| 6,671,520 B1 | * | 12/2003 | Kim ........................ 455/556.1 |
| 6,731,952 B2 | * | 5/2004 | Schaeffer et al. ........... 455/557 |
| 6,957,040 B1 | * | 10/2005 | Tanaka ..................... 455/3.06 |

FOREIGN PATENT DOCUMENTS

| | | |
|---|---|---|
| DE | 19528424 A1 | 11/1996 |
| EP | 0695072 A2 | 1/1996 |
| EP | 0 953 901 A2 | 11/1999 |
| EP | 1158786 A2 | 5/2001 |
| GB | 2346761 A | 8/2000 |
| WO | WO-99/52032 | 10/1999 |
| WO | WO-00/07357 A1 | 2/2000 |
| WO | WO-01/69470 A1 | 9/2001 |

OTHER PUBLICATIONS

Pub. No. 2001189920, pub'd Jul. 10, 2001 in Europe, Patent Abstracts of Japan.

* cited by examiner

*Primary Examiner*—Tilahun Gesesse
(74) *Attorney, Agent, or Firm*—Harrington & Smith, PC

(57) ABSTRACT

Method and device for transmitting information between electronic devices, which are able to send and to receive information as well as be in wireless communication connection with each other. In the method an active communication connection is identified and in case the communication connection is active following phases are carried out: the first earlier mentioned electronic device sends automatically the information the user of the earlier mentioned device has chosen as a response to the identified communication connection and the earlier mentioned information is automatically presented by the other electronic device to the user of the other electronic device as a response to the identified communication connection.

20 Claims, 5 Drawing Sheets

Figure 1A:
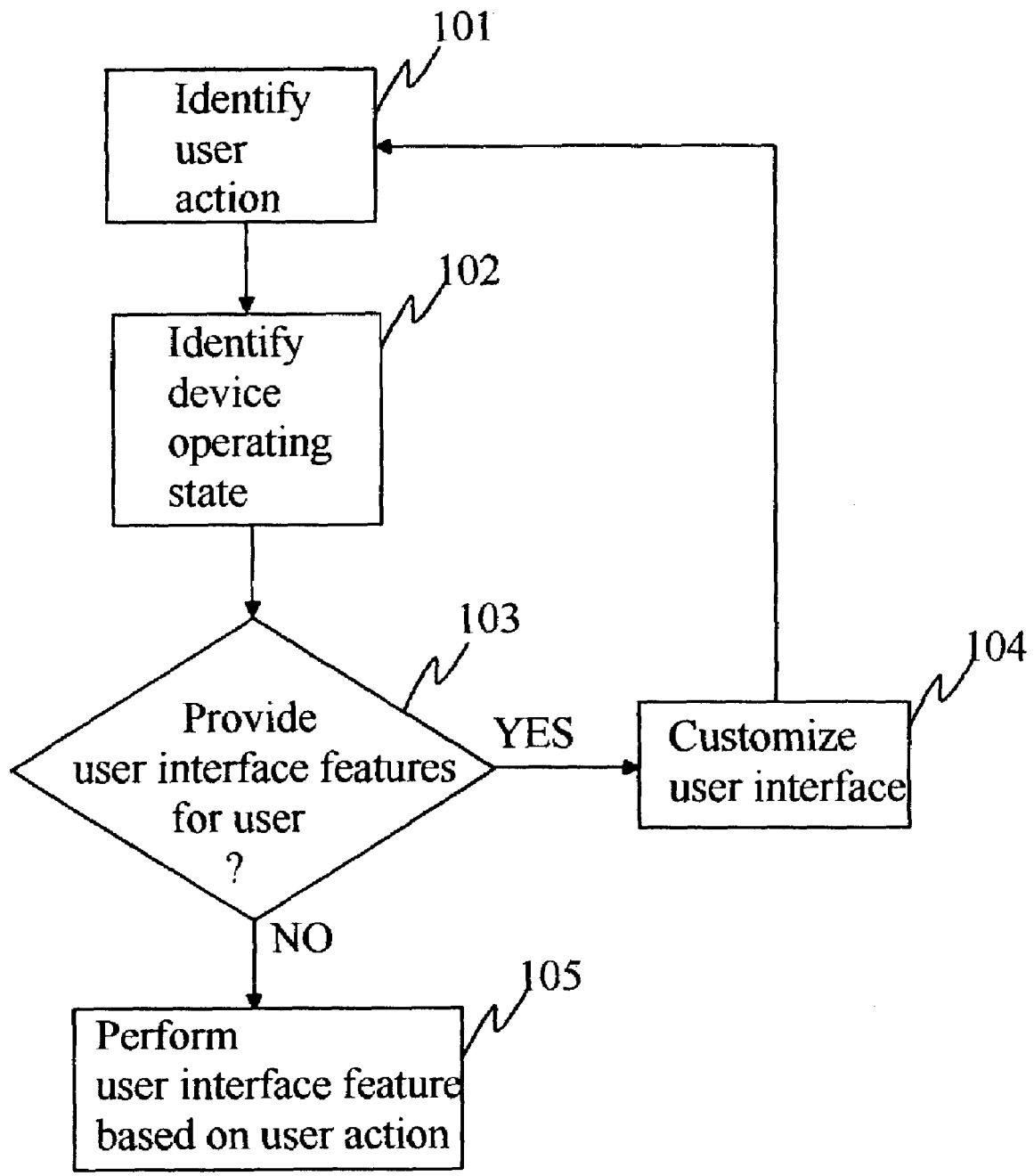

METHOD AND DEVICE FOR SPEEDING UP AND SIMPLIFYING INFORMATION TRANSFER BETWEEN ELECTRONIC DEVICES

The present invention relates to a method and system for mobile telecommunication and especially, but not necessary to a method and system for editing a user interface of an electronic device on the basis of operation performed by a user and communication connection of an electronic device.

TECHNICAL BACKGROUND

Nowadays it is possible to send and receive information, such as text messages during a voice connection with telecommunication devices, such as mobile telecommunication devices operating in GSM-system. Sending text messages during a voice connection is difficult to realize by the user and through text messages there can be given no such additional information that could not be sent as spoken information.

In the future apart from text messages it is also possible to send multimedia with a mobile phone, such as voice and moving pictures. While operation possibilities and various kinds of information transmitting possibilities, for example, are increasing it is important that the use of a telecommunication device is even then easy and simple. This is advantageous especially in case two users of telecommunication devices are in connection with each other and want to share also other information during this communication connection.

SUMMARY OF THE INVENTION

Now is invented a method and a system, purpose of which is to simplify and speed up the use of an electronic device, such as a wireless telecommunication device in connection with sending various kinds of multimedia messages from one device to another advantageously when the device is in communication connection with the other device. When a user performs an operation (for example, takes an image with a camera that is placed in the device or that is integrated to it) the device identifies the mode of the device at that moment (is a call active or not) and edits the user interface on the basis of the identified mode by offering a possibility to send the taken image straight to the device with which the communication connection had been made (for example, from A-subscriber to B-subscriber).

The use of multimedia functions increases when a telecommunication device is able to offer the user such functions that he probably would like to use in each case.

The objective of the invention is that on the basis of its mode and operations performed by a user the telecommunication device may automatically edit the user interface offered to a user. Taking an image (creating a digital image information) and sending it to B-subscriber while the phone connection is active is only one example. The invention may also be applied to other multimedia. According to a first aspect of the invention a method is provided for transferring information between the first electronic device and at least one other electronic device, the first electronic and the at least one other electronic device being able to send and receive information as well as being able to be in a wireless communication connection with each other, the first electronic device being able to perform an operation associated with processing of information, and the first electronic device being able to identify the wireless communication connection between said first electronic device and the at least one other electronic device, wherein the method comprising as a response to a situation in which the wireless communication connection is identified to be active and a performance of an operation associated with processing of information is identified, a first command is provided as an option of a user interface of the first electronic device, which first command includes a possibility to send said information to the at least one other electronic device, and the first command is used for sending said information to the at least one other electronic device.

According to a second aspect of the invention an electronic device is provided comprising means for establishing a wireless communication connection for creating a wireless communication connection between the electronic device and at least one other electronic device, sending means for sending information, receiving means for receiving information, a user interface for presenting information to a user of the electronic device, processing means for performing an operation associated with processing of information, identifying means for identifying the wireless communication connection between the first electronic device and the at least one other electronic device, and first controlling means of the user interface for providing a first command that is an option of the user interface as a response to a situation in which the wireless communication connection is identified to be active and a performance of an operation associated with processing of information is identified, which first command comprises a possibility to send said information to the at least one other electronic device.

According to a third aspect of the invention a computer program product is provided for an electronic device the electronic device comprising means for creating a wireless communication connection for establishing a wireless communication connection with at least one other electronic device, sending means for sending information, receiving means for receiving information, and a user interface for presenting information to a user of the electronic device, wherein the computer program product comprises computer program means for performing an operation associated with Processing of information, computer program means for identifying a wireless communication connection between the electronic device and the at least one other electronic device, and computer program means for providing a command that is an option of the user interface as a response to a situation in which the wireless communication connection is identified as being active and a performance of an operation associated with Processing of information is identified, which command comprises a possibility to send said information to the at least one other electronic device.

Figure 1B:
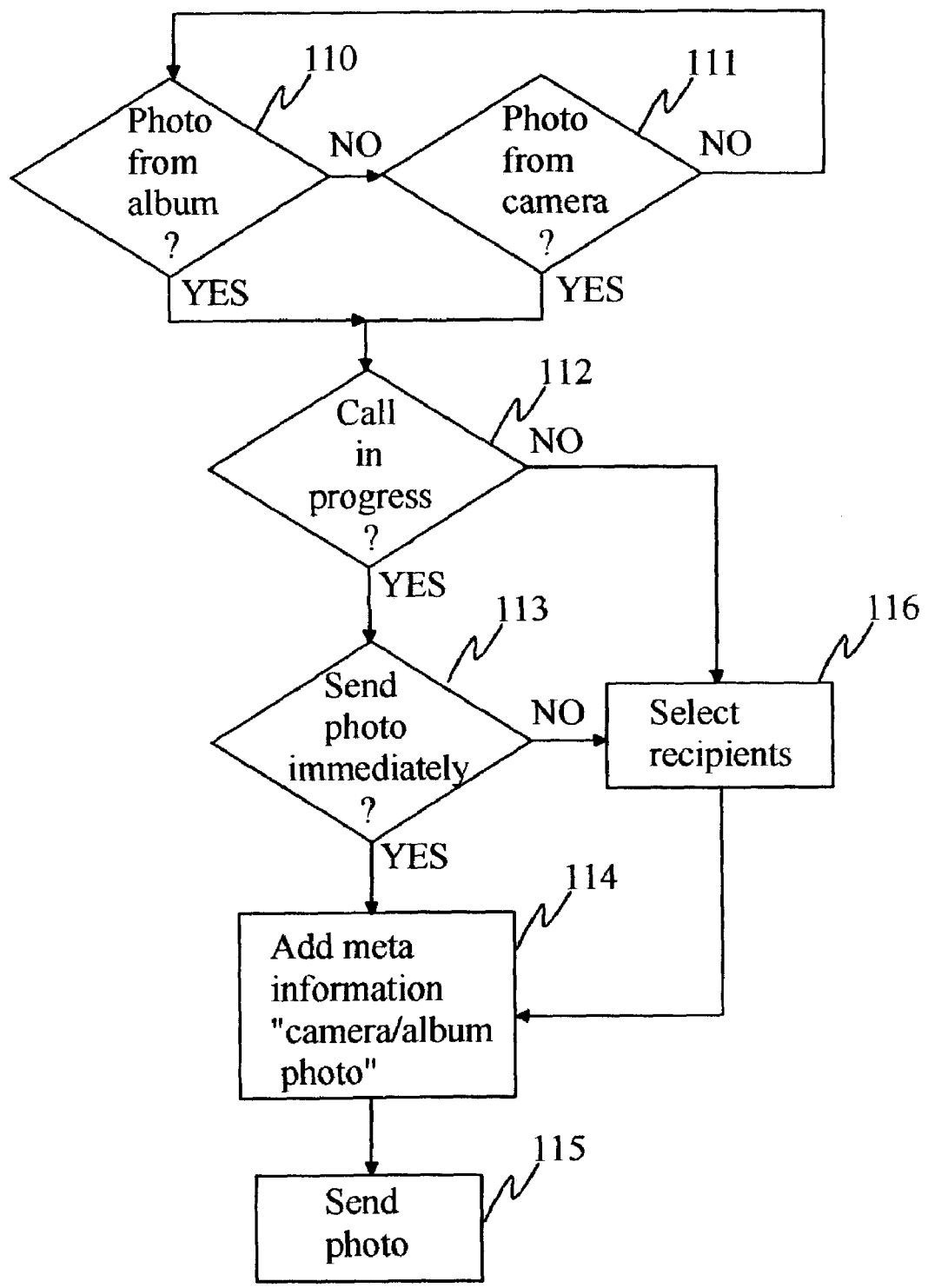
Figure 1C:
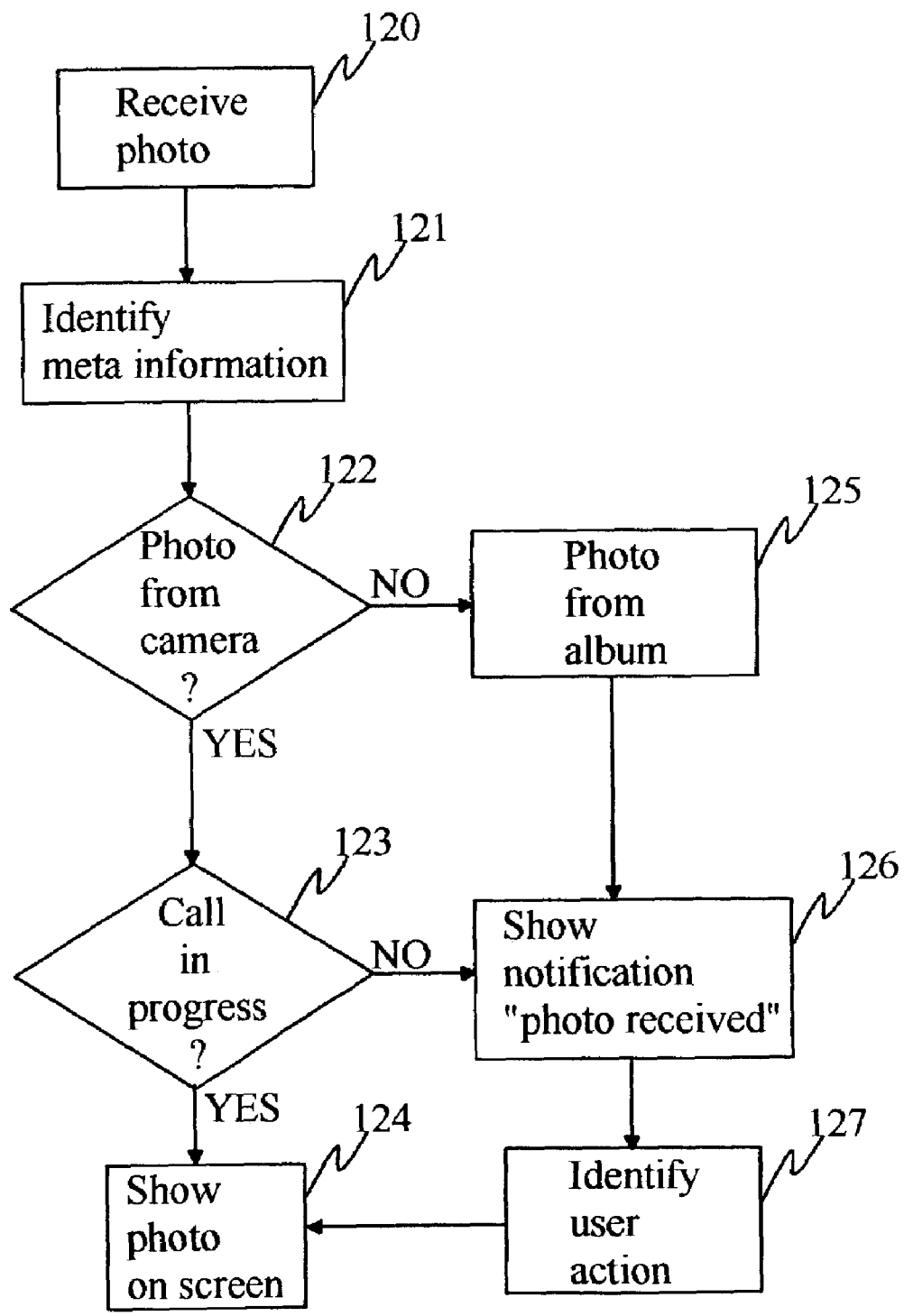
Figure 2A:
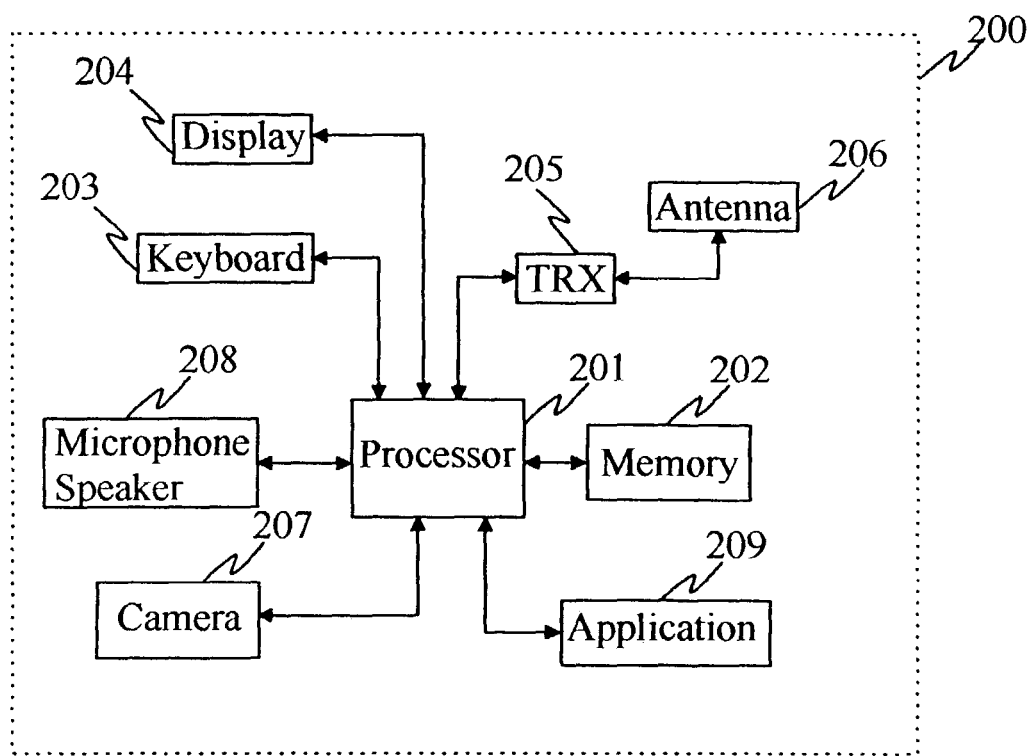
Figure 2B:
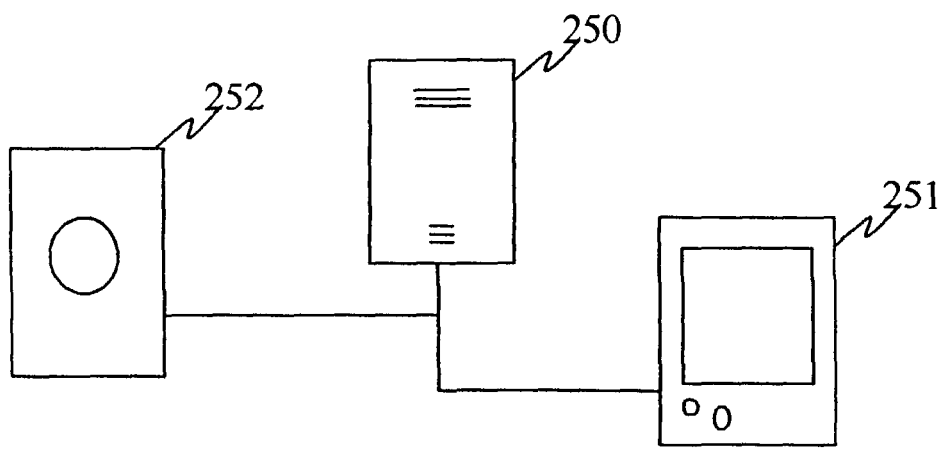

Next, the invention will be explained in more detail with reference to the accompanying drawings, in which, FIG. 1a illustrates a flowchart of a method according to an embodiment of the invention, FIGS. 1b and 1c illustrate a flowchart of a method according to an alternative embodiment of the invention, FIG. 2a illustrates an electronic device according to an embodiment of the invention, FIG. 2b illustrates a system according to an embodiment of the invention.

Figure 3:
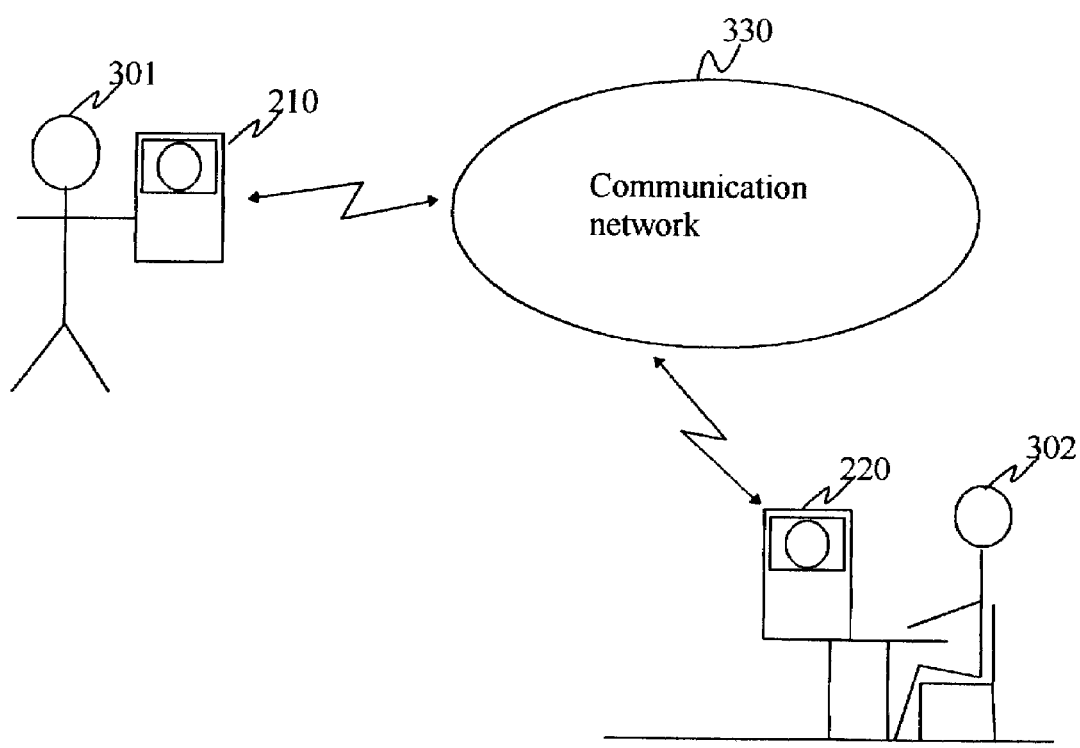

FIG. 3 illustrates a system according to an alternative embodiment of the invention.

DETAILED DESCRIPTION OF THE INVENTION

FIG. 1a illustrates a flowchart of a method according to an embodiment of the invention. Phases of the method may advantageously be implemented with a computer program-code stored in the electronic device. In the phase 101 the telecommunication device identifies the operation performed by a user, for example, taking an image with a camera integrated to the device. The device identifies the present mode in phase 102, i.e. whether the device is in state of readiness or in communication connection and/or data connection with another communication device, for example through a communication network. Phase 103 examines, depending on user's operation through user interface and on the mode of the device, whether new operations through user interface of the device are offered to the user of the device. User's operation in the phase 103 may be, for example, creating of visual information on the device or retrieve said information from the memory of the device. Said information may also be audio information or audio visual information, such as video clips, which information may be created in the device in case the device provides saving of image and/or voice. In the phase 104 the interface is edited as a response to the user's operation and to the mode of the device by offering the user a menu, which includes a possibility to send said information straight to the other part of the communication connection after which phase 101 follows. In case the user's operation and the mode of the device in the phase 103 require that there will be no new operation offered through the user interface, phase 105 follows, in which the operation is performed by the device as a response to user's operation and to the mode of the device. Said operation is advantageously sending the information mentioned in phase 104 straight to at least one other electronic device.

FIG. 1b illustrates a flowchart of a method according to an alternative embodiment of the invention. The phases of the method may advantageously be implemented by a computer program code stored in the electronic device. In phases 110 and 111 the user's operation is recognized, i.e. it is examined whether an image has been retrieved from the image index in the memory of the device (phase 110) or has the image been taken with the camera (phase 111). Images may also be retrieved from an outer memory, for example, from a PC in Bluetooth connection with the device or from a separate camera, or from separate network service (web etc.). In the phase 112 the present mode of the device is identified, that is whether the device is in state of readiness or in communication connection, such as voice or/and data connection, for example with another device. In case the user of the device has taken an image with a camera and a communication connection from one device to another is active it is possible to check from the user in the phase 113, whether he wants the image to be sent straight to the device with which the connection is open, in which case additional information is added to the image information (phase 114), which tells the receiver whether the image has been taken with the camera or has it been retrieved from the image album of the device. The additional information may include also other information, for example the title of the image. Next the image is sent to the device of the receiver through communication network (phase 115). In case the communication connection is not active in the phase 112 or in the phase 113 the image is not send immediately, phase 116 follows. As the image may also be sent to others apart from the other part of the communication connection, the user of the device may define in the phase 116 to whom the image is alternatively or as well sent (for example to the other part of the earlier mentioned communication connection and/or to a third party), after which said information is added in the phase 114 to the image information and the image is sent to the receiver in the phase 115.

FIG. 1c illustrates a flowchart of a method according to an alternative embodiment of the invention. The phases of the method may advantageously be implemented by means of a computer program code stored in the electronic device. In the phase 120 an electronic device, such as a telecommunication device receives an image, after which the additional information added to the image information is identified in phases 121, 122 and 125. In case the received image has been taken with the camera of the device (phase 122) the phase 123 follows, in which phase the mode of the device is examined, i.e. whether the device is in state of readiness or is the device in communication connection with the device which sent the image. In case communication connection is active the image is presented on the display of the device (phase 124). In case the sent image has been taken from the image album of the device (phase 125) on the display of the receiving device may be presented a short message to the user of the device, for example "image received" (phase 126), after which, in phase 127, user's operation is identified, for example, whether the user will present the image on the display (phase 124) or not.

FIG. 2a illustrates an electronic device in accordance with an application of the invention. The device 200 is advantageously an electronic device operating in a wireless communication system, such as a GPRS- or WCDMA-device or a device operating in WLAN or Bluetooth system. The device 200 includes identifying equipment (209) for identifying operation carried out and the mode of the device as well as forming equipment (201, 202, 205, 206 and 209) for forming at least two different modes: state of readiness and a communication connection with another electronic device, which communication connection is advantageously a voice or a data connection. Communication connection may be, for example, circuit switched or packet switched connection. The device includes a user interface (203, 204) in order to offer at least one first operation to be carried out with the device and forming equipment (209) for forming the earlier mentioned user interface on grounds of identified operation carried out and identified mode by offering the user of the device at least one other operation through earlier mentioned user interface. The device 200 includes a processor 201 and memory 202 for realizing the operations of the device, a keyboard 203, or some other method, such as a pointer, a joystick or voice guidance, for feeding the information to the device 200 as well as a display 204 for presenting the information, such as the user interface. The device 200 includes, furthermore, a communication forming equipment, such as a transmitter-receiver 205 and an antenna 206 for creating a wireless communication connection, for example, to another device through a communication network. The device 200 includes, furthermore, a camera 207 for creating visual information, a microphone and a loudspeaker 208 for presenting and creating audio information as well as at least one application 209, such as a computer programme product for editing the earlier mentioned user interface as a response to user's operations and the identified mode of the device. The camera 207 includes advantageously at least one optic lens for creating an optic image on the viewfinder of the camera, which is advantageously, either CCD or CMOS pixel matrix. The device 200 includes, furthermore, processing equipment for processing the operations connected to information during the communication connection as a response to user's input. The earlier mentioned processing equipment includes advantageously a processor 201, a memory 202, a keyboard 203, a display 204, a camera 207, a microphone 208 and a computer programme application 209. Identifying equipment for identifying an active communication connection between the earlier mentioned first and earlier mentioned at least one other electronic device includes advantageously a processor 201, a memory 202 and an application 209. The first and the other processing equipment of the user interface for offering a menu to the user of the device as a response to the identified communication connection and an operation connected to the information straight to earlier mentioned at least one other electronic device include advantageously a processor 201, a memory 202, a display 204 and a computer programme application 209. In case the used communication connection is a circuit switched connection, such as a GSM connection, sending of the earlier mentioned information is carried advantageously out by using a packet switched connection such as a GPRS connection. In case a communication connection in use is a packet switched connection the earlier mentioned information may advantageously be sent using the same connection. The earlier mentioned electronic device is not limited to be a wireless communication device with an integrated user interface and a camera.

FIG. 2b illustrates a system according to an embodiment of the invention for editing a user interface. The system includes an electronic device 250, such as a wireless communication device, which may be a voice-guided device, for sending and receiving information. The communication device is capable of being on at least two different modes: the state of readiness and a communication connection with another electronic device, for example, through a communication network. The system includes, furthermore, a PDA device 251, through user interface of which to the user is offered to choose the first operation to be carried out with the other electronic device included to the system. The system may, furthermore, include a third electronic device 252, such as a digital camera or a videocamera for creating image and voice information.

Through the user interface the user is offered to choose the first operation, which may advantageously be producing of information, such as taking an image with a camera 252. The user directs the camera 252 to the object and chooses "take a picture" from the menu offered by the user interface. The camera carries out the functions related to taking an image and the image is stored, for example, to the memory of the camera 252. The system identifies the function carried out by the camera, for example, by the user interface. Next the system identifies the mode of the device 250, i.e. whether the device is in state of readiness or is the device in communication connection with another device. On the basis of identified operation carried out and the identified mode the user interface of PDA device is edited advantageously such that the user is offered another operation through the user interface to choose, which another operation is advantageously sending the earlier mentioned image by the device 250, for example, to another device. The operation may be offered, for example, in a menu, which includes options, such as a send-command for sending information to the opposite part of the communication connection and a cancel-command with which the sending of the information may be cancelled. The menu may also include other commands apart from earlier mentioned.

FIG. 3 illustrates a system according to an embodiment of the invention. In the system the user 301 of the device 210 creates a communication connection to the user 302 of the device 220 through a communication network 330. After creating a communication connection the user of the device 210 captures an image with a camera integrated to the device, for example, of himself during the communication connection and sends the image information to the device 220. The image information includes, for example, still-image and video picture of the user of the device 210. The device 210 identifies the operation performed by the user 301 as well as the mode of the device and is able automatically to suggest through the user interface the user 301 to send the image information to the device 220. Alternatively the device 210 may send the image information to the device 220 also automatically such that there is no need for the user to accept the suggestion of the device.

The device 220 of the user 302 receives the image information advantageously such that the device 220 identifies the operation performed by the user 301 of the device 210, i.e. the forming of the image information and sending it to the device 220 and the mode of the device 220, i.e. that the communication connection is active between devices 210 and 220. On the basis of this the device 220 presents automatically the image information to the user 302 on the display of the device 220.

The above disclosure illustrates the implementation of the invention and its embodiments by means of examples. A person skilled in the art will find it apparent that the invention is not restricted to the details of the above-described embodiments and that there are also other ways of implementing the invention without deviating from the characteristics of the invention. The above embodiments should thus be considered as illustrative and not restrictive. Hence the possibilities of implementing and using the invention are only restricted by the accompanying claims and therefore the different alternative implementations of the invention, including equivalent implementations, defined in the claims also belong to the scope of the invention.

The invention claimed is:

1. A method for transferring information between a first electronic device and at least one other electronic device,
   the first electronic and the at least one other electronic device being able to send and receive information as well as being able to be in a wireless communication connection with each other,
   the first electronic device being able to perform an operation associated with processing of information, and
   the first electronic device being able to identify the wireless communication connection between said first electronic device and the at least one other electronic device, wherein the method comprising:
   as a response to a situation in which the wireless communication connection is identified to be active and a performance of an operation associated with processing of information is identified, a first command is provided as an option of a user interface of the first electronic device, which first command includes a possibility to send said information to the at least one other electronic device, and
   the first command is used for sending said information to the at least one other electronic device.

2. A method in accordance with claim 1, wherein said information is provided to the user of the at least one other electronic device as a response to a situation in which the wireless communication connection is identified to be active by the at least one other electronic device.

3. A method in accordance with claim 2, wherein said information is provided to the user of the at least one other electronic device by providing a second command that is an option of a user interface of the at least one other electronic device, which second command comprises a possibility to receive said information.

4. A method in accordance with claim 2, wherein the operation associated with processing of information is one of the following: retrieving information stored in a memory of the first electronic device and creating information by the first electronic device.

5. A method in accordance with claim 4, wherein said information is at least one of the following: real time visual information, real time audio information, real time audio-visual information, stored visual information, stored audio information and stored audio-visual information.

6. A method in accordance with claim 1, wherein in the user interface of the first electronic device a cancel-command is provided, which cancel-command includes a possibility to cancel the sending of said information to the at least one other electronic device.

7. A method in accordance with claim 1, wherein said wireless communication connection is at least one of the following: voice connection and data connection between the users of said electronic devices.

8. A method in accordance with claim 1, wherein the wireless communication connection is a phone connection and operation associated with processing of information is a video clip created in the first electronic device, wherein the first electronic device comprises a camera, a microphone, a loudspeaker, and a transmitter-receiver.

9. An electronic device comprising
means for establishing a wireless communication connection for creating a wireless communication connection between the electronic device and at least one other electronic device,
sending means for sending information,
receiving means for receiving information,
a user interface for presenting information to a user of the electronic device,
processing means for performing an operation associated with processing of information,
identifying means for identifying the wireless communication connection between the first electronic device and the at least one other electronic device, and
first controlling means of the user interface for providing a first command that is an option of the user interface as a response to a situation in which the wireless communication connection is identified to be active and a performance of an operation associated with processing of information is identified, which first command comprises a possibility to send said information to the at least one other electronic device.

10. An electronic device in accordance with claim 9, wherein the electronic device further comprises a second controlling means of the user interface for providing information that is received in the electronic device to the user of the electronic device as a response to a situation in which the wireless communication connection is identified to be active.

11. An electronic device in accordance with claim 10, wherein said second controlling means of the user interface have been arranged to provide a second command that is an option of the user interface, which second command comprises a possibility to accept said information that is received in the electronic device.

12. An electronic device in accordance with claim 10, wherein said first and second controlling means of the user interface have been arranged to provide said first command and said second command in a menu, which menu further comprises a cancel-command, with which a sending of said information to said at least one other electronic device is capable of being cancelled by the user of the electronic device.

13. An electronic device in accordance with claim 9, wherein said processing means have been arranged to carry out one of the following: retrieving information stored in a memory of the electronic device and creating information by the electronic device.

14. An electronic device in accordance with claim 13, wherein said information stored in the memory is one of the following: visual information, audio information, audio-visual information.

15. An electronic device in accordance with claim 13, wherein said information to be created by the electronic device is one of the following: real time visual information, real time audio information, real time audio-visual information.

16. A computer program product embodied in a computer readable medium for an electronic device, the electronic device comprising means for creating a wireless communication connection for establishing a wireless communication connection with at least one other electronic device, sending means for sending information, receiving means for receiving information, and a user interface for presenting information to a user of the electronic device, wherein the computer program product comprises:
computer program means for performing an operation associated with processing of information,
computer program means for identifying a wireless communication connection between the electronic device and the at least one other electronic device, and
computer program means for providing a command that is an option of the user interface as a response to a situation in which the wireless communication connection is identified as being active and a performance of an operation associated with processing of information is identified, which command comprises a possibility to send said information to the at least one other electronic device.

17. A computer program product embodied in a computer readable medium in accordance with claim 16, wherein the computer program product further comprises a computer program means for providing information that is received in the electronic device to the user of the electronic device as a response to a situation in which the wireless communication connection is identified as being active.

18. A computer program product embodied in a computer readable medium in accordance with claim 17, further comprising computer program means for selecting recipients of said information.

19. A computer program product embodied in a computer readable medium in accordance with claim 18, wherein the operation whose performance is identified is performed.

20. A computer program product embodied in a computer readable medium in accordance with claim 18, wherein the wireless communication connection is a phone connection and operation associated with processing of information is one of the following:
retrieving multimedia information stored in a memory and creating multimedia information.

* * * * *